United States Patent [19]

Matsui

[11] 4,370,362

[45] Jan. 25, 1983

[54] METHOD OF MANUFACTURING TRANSFER PAPERS

[76] Inventor: Yoshi Matsui, 28-15 2-chome, Asakusabashi, Taito-ku Tokyo, Japan

[21] Appl. No.: 267,332

[22] Filed: May 26, 1981

[30] Foreign Application Priority Data

May 27, 1980 [JP] Japan ................................. 55-70357

[51] Int. Cl.$^3$ .............................................. B41M 5/00
[52] U.S. Cl. .................................... 427/153; 427/152; 428/488; 428/537; 428/914
[58] Field of Search ............ 427/146, 152, 153, 398.1; 260/429 R; 106/31, 32.5; 428/488, 537, 914

[56] References Cited

U.S. PATENT DOCUMENTS

| | | | |
|---|---|---|---|
| 2,112,762 | 3/1938 | Chatfield | 106/32.5 |
| 3,481,759 | 12/1969 | Ostlic | 427/153 |
| 3,895,130 | 7/1975 | Burnich et al. | 427/153 |

*Primary Examiner*—Michael R. Lusignan
*Assistant Examiner*—Janyce A. Bell
*Attorney, Agent, or Firm*—Fred Philpitt

[57] ABSTRACT

A transfer paper for use in drawing patterns or marking designs on a sheet material, comprising a base material and on one or both surfaces thereof, a water-soluble or water-dispersible transfer coating comprising cobalt thiocyanate, wax, a non-ionic surfactant and another surfactant.

2 Claims, No Drawings

METHOD OF MANUFACTURING TRANSFER PAPERS

SUMMARY OF INVENTION

This invention relates to a novel method of manufacturing a transfer paper for use in drawing patterns or marking designs on base materials such as paper or cloth and the like when primarily engaged with sewing or needlework or other works requiring markings, and the transferred patterns or the designs can be erased with water instantly.

Heretofore, this kind of transfer papers are such that the transferred patterns or designs or the like are difficult to be erased with water and dirty stains remain on the base materials which result in poor finish. And also, it takes a troublesome work or longer time to erase the dirty patterns or designs remained on the base materials completely, and such drawbacks are regarded as obstacles to improvement of efficiency in the foregoing works or operations.

This invention is to provide a method of manufacturing the transfer paper whose patterns or designs can be erased with water instantly which eliminates the foregoing obstacles and allows the easy redrawing or correction in a speedy manner.

According to the present invention, there is provided a transfer paper comprising a base material and on one or both surfaces thereof, a water-soluble or water-dispersible transfer coating comprising cobalt thiocyanate, wax, a non-ionic surfactant and another surfactant.

The present invention also comprises a method of making a transfer paper, which comprises forming a homogeneous mixture of cobalt thiocyanate, wax, a non-ionic surfactant, and another surfactant to form a wax ink, and melt coating the wax ink on to one or both surfaces of a base material.

According to the present invention, in a preferred method of making the transfer coating, the non-ionic surfactant and any optional ingredients, such as silica gel, are first dissolved or dispersed in a melt of the wax or waxes. A solution of the cobalt thiocyanate in the other surfactant is separately prepared and this solution is added to the molten wax solution while maintaining the mixture at a temperature above the melting point of the wax or waxes. After thorough mixing, the molten wax ink is then coated on the base material of the transfer paper.

The transfer coating used according to the invention does not contain any pigments (other than the cobalt thiocyanate) or any bulking agents, and when transferred patterns on a sheet material are washed with water, the lines or patterns are immediately erased leaving no traces on the sheet material. This effect is due to the fact that cobalt thiocyanate is itself blue and acts as a blue pigment, but is rapidly ionized in the presence of water to give colorless ions, $Co^+$ and $SCN^-$, and the other constituents of the transfer composition are formulated to be water-soluble or water-dispersible. The cobalt thiocyanate used is conveniently formed by the reaction of cobalt sulphate and calcium thiocyanate. An example of this method is given below.

The wax used in the transfer coating may be of animal, vegetable or mineral origin; it is generally preferred to use a mixture of waxes. The other surfactant is preferably an amine surfactant.

DETAILED DESCRIPTION OF INVENTION

To prepare the cobalt thiocyanate employed in the present invention, 25 kgs of cobalt sulfate is completely dissolved in 25 liter of water, and 4.5–5.0 kgs of calcium thiocyanate is added to the foregoing solution after the stirring reaction is over, the solution is filtered, and the calcium sulfate is removed and the filtrate is heated to evaporate the water whereby the crystals are produced (namely, by evaporation drying).

$$COSO_4 + Ca(SCN)_2 = CO(SCN)_2 + CaSO_4$$

The cobalt thiocyanate $CO(SCN)_2$ ionization reaction removes the blue color.

$$CO(SCN)_2 \rightleftarrows CO^{\oplus} + 2SCN^{\ominus}$$

The transfer coating of the present invention is prepared as disclosed below.

EXAMPLE 1

The following ingredients:
Wax stearate: 14.0 kgs
Carnauba wax: 2.0 kgs
Mineral wax: 1.0 kg
Nonionic activator: 3.0 kgs
Silica gel: 0.8 kg are melted by heating to produce a solution at a temperature sufficient to melt waxes, about 70° C. to 80° C. 4.0 kg of amine surfactant and this solution is added to the wax melt referred to above. The mixture is thoroughly mixed while maintaining a temperature above the melting point of the waxes.

The molten wax ink obtained is coated on one or both surfaces of a suitable base material, such as paper or cloth, to provide, after cooling and solidification of the transfer coating, a transfer paper for use in drawing patterns or designs on sheet materials.

The transfer paper of this invention is different from conventional transfer paper whose blue color is produced by mixing various coloring matters with pigment titanium oxide, in that this invention provides a chemical ionization reaction with water which eliminates the blue color of the transfer coating and provides a physical reaction wherein the dispersion is hydrophilic.

EXAMPLE 2

As another example, the following mixing ratio can be employed to obtain the wax ink of this invention.

| Cobalt thiocyanate | 4.0 kgs | 13.89% |
| Wax stearate | 14.0 kgs | 48.61% |
| Carnauba wax | 2.0 kgs | 6.94% |
| Mineral wax | 1.0 kg | 3.47% |
| Nonionic activator | 7.0 kgs | 24.31% |
| Silica gel | 0.8 kg | 2.78% |
| Total: | 28.8 kgs | 100.00% |

The preferred embodiments of the invention have been disclosed to further illustrate its objects and advantages, and it will be understood that modifications and variations may be effected without departing from the scope of the invention.

What is claimed is:

1. A method of making a transfer paper, which comprises forming a homogeneous mixture of cobalt thiocyanate, wax, a non-ionic surfactant, and another surfactant to form a wax ink, and melt coating the wax ink on to at least one surface of a base material.

2. A method according to claim 1, in which the other surfactant is an amine surfactant.

* * * * *